Dec. 29, 1964 H. C. BARR 3,163,294

RECORD FILING DEVICE

Filed Oct. 8, 1962 3 Sheets-Sheet 1

INVENTOR.
HUGH C. BARR
BY
Gary, Desmond & Parker
ATTYS.

INVENTOR.
HUGH C. BARR
BY
Gary, Desmond & Parker
ATTYS.

Dec. 29, 1964 H. C. BARR 3,163,294

RECORD FILING DEVICE

Filed Oct. 8, 1962 3 Sheets-Sheet 3

INVENTOR.
HUGH C. BARR
BY
Gary, Desmond & Parker
ATTYS.

United States Patent Office 3,163,294
Patented Dec. 29, 1964

3,163,294

RECORD FILING DEVICE

Hugh C. Barr, Staunton, Va., assignor to Acme Visible Records, Inc., Crozet, Va., a corporation of Delaware Filed Oct. 8, 1962, Ser. No. 229,051
3 Claims. (Cl. 211—58)

This invention relates to improvements in record filing devices.

More particularly the present invention relates to improvements in record filing devices of the class wherein a vertically spaced pair of discs are rotatably mounted on a shaft and a plurality of vertically extending record panels are disposed edgewise between said discs on pivot means carried by the panels and engaged between said discs adjacent their outer peripheral edges. These record panels are generally spaced fairly close to each other so as to enable the assembly to carry a maximum number of record panels. When the assembly is rotated for access to a particular panel, and particularly when the assembly is motor driven, it has been found that the inertia of these record panels, which are generally fairly large and heavy, causes them to slam and clatter against each other and to break apart quite rapidly.

It is, therefore, an object of the present invention to provide stop means on the aforesaid discs and disposed between the adjacent record panels whereby to limit the pivotal movement of the panels and to thereby reduce tendency to destroying or damaging them by undue abutment of one against the other.

It is a further object of the present invention to provide panel stops as aforesaid which will limit the opening between two adjacent record panels to the angle required for reference to the data carried by the panels, the panel stops being arranged to limit the amount of swing of the frames and to absorb a large portion of the force resulting from swinging of the panels.

Other objects of the present invention relate to details of construction, arrangement of parts, and economies thereof, which will be apparent from the following specification and accompanying drawings, wherein.

Figure 2:
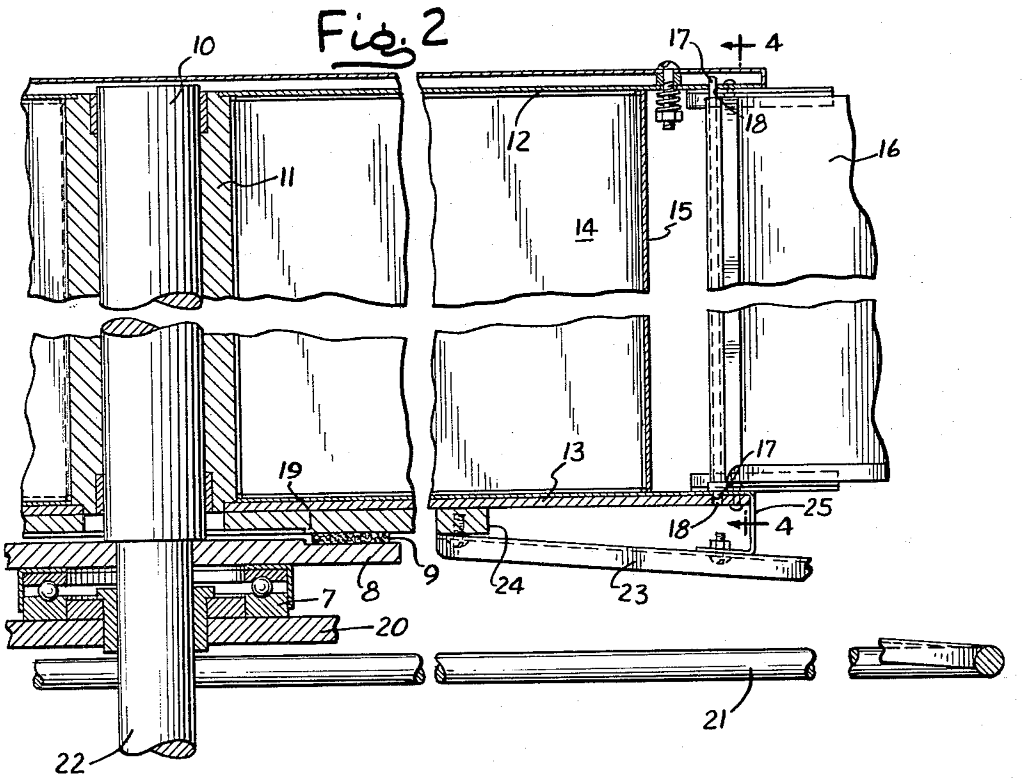
FIG. 2 is a fragmentary vertical sectional view of the device of the present invention.

Referring to the drawings, and particularly to FIG. 2, the assembly of the present invention comprises a vertically disposed axial shaft 10 embraced by the hub 11, the latter in turn carrying the spaced upper disc 12 and lower disc 13. For the purpose of supporting the assembly, there are disposed between the discs 12 and 13 the radially extending stabilizer plates 14 and about which there is secured the tubular shell 15 inwardly of the outer peripheral edges of the discs 12 and 13.

Adjacent the outer peripheral edges of the discs 12 and 13 and vertically disposed between them are mounted a plurality of equally spaced record panels 16 on pivot means 17, 17 carried by the rear edge of the panel and extending laterally therefrom into apertures 18, 18 formed in the discs 12 and 13, these apertures 18 being all disposed on a uniform radius.

The hub 11, and its associated components, is rotatably supported about the shaft 10 on the further associated plate 19. This plate 19, and its thus associated components, may be driven, i.e., rotated through the clutch disc 9 carried on the clutch plate 8 welded to shaft 22 supported on the bearing assembly 7 in turn supported on the base or stand component 20.

Figure 1:
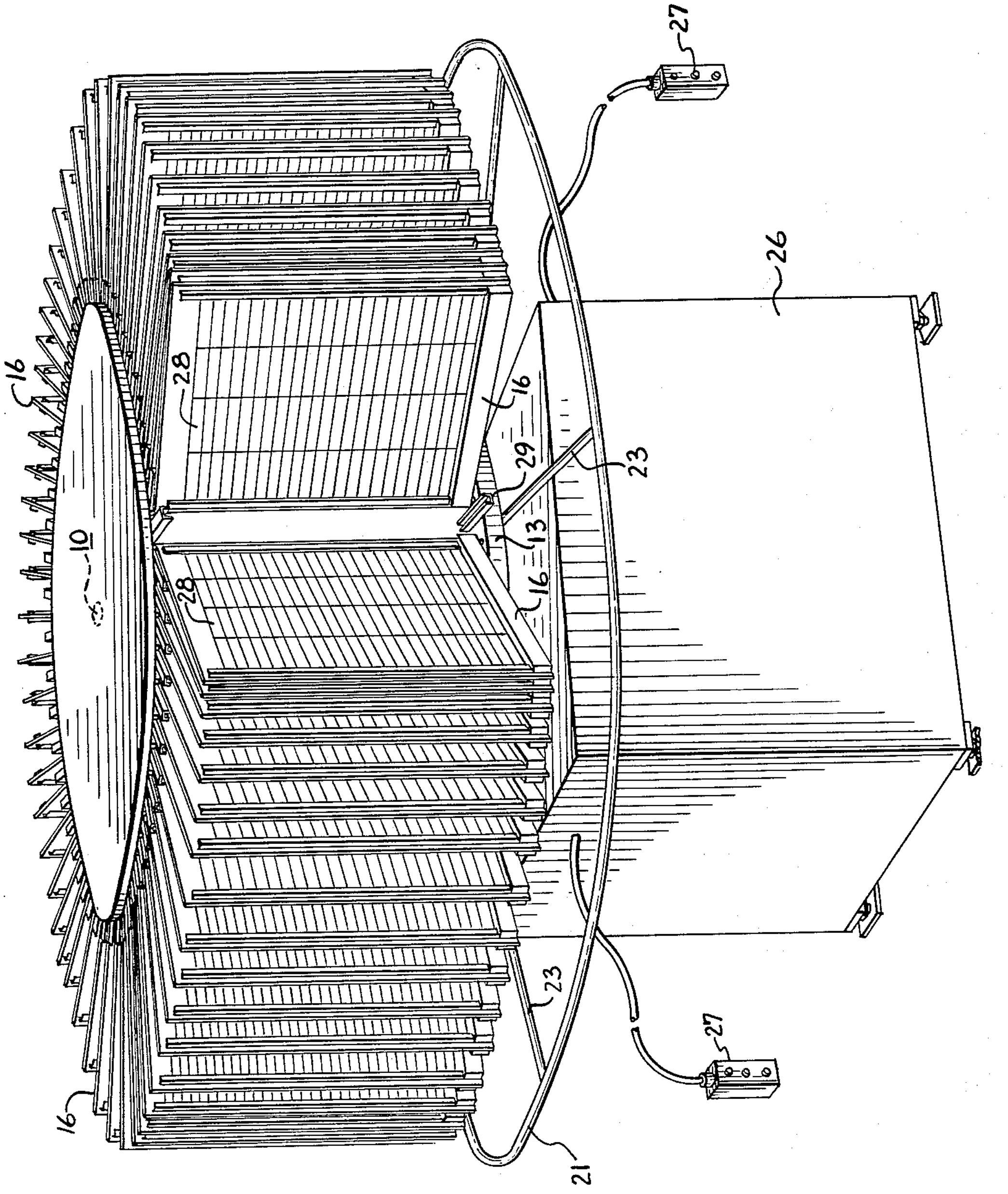
FIG. 1 is a perspective view of a record filing device embodying the present invention.

Shaft 22 may be rotated by motor means, not shown, enclosed within the cabinet base 26 and actuated by electrical controls 27 as is known in the art for stopping rotation, or for rotation either clockwise or counterclockwise, as generally indicated in FIG. 1.

For manual rotation of the assembly, a hand rail 21 is provided which embraces the lower shaft 22 and is secured, by inward radially extending components 23 in FIG. 2, as at 24 and by means of the angle plate 25 to the disc 13. Thus, the assembly of the discs 12 and 13 and the record panels 16 pivotally engaged between them may be rotated as a unit by means of the hand rail 21.

As indicated diagrammatically in FIG. 1, the record panels 16 carry indicia strips or the like 28 on their opposed faces, and for inspection these record panels can be angularly spaced and the entire assembly rotated for the convenience of one or more operators seated or standing about the assembly, by either the indicated electrical motor means or by the hand rail 21.

In angularly spacing the record panels as indicated in FIG. 1 or when it is desired to shift the entire assembly, and particularly in the latter instance, there is a tendency for the record panels or frame 16 to slam and clatter against each other and become damaged. In order to prevent this the present invention provides panel stop means generally indicated as 29 which are lever arms pivoted to the discs 12 and 13 as at 30 adjacent the outer peripheral edges of the said discs and medially between an adjacent pair of panels 16. In the preferred embodiment shown these stops or arms 29 are pivoted on a greater radius from the axial shaft than that on which the panels are pivoted, or on a concentric circle having a diameter greater than that of the circle on which the panels 16 are pivoted.

Figure 6:
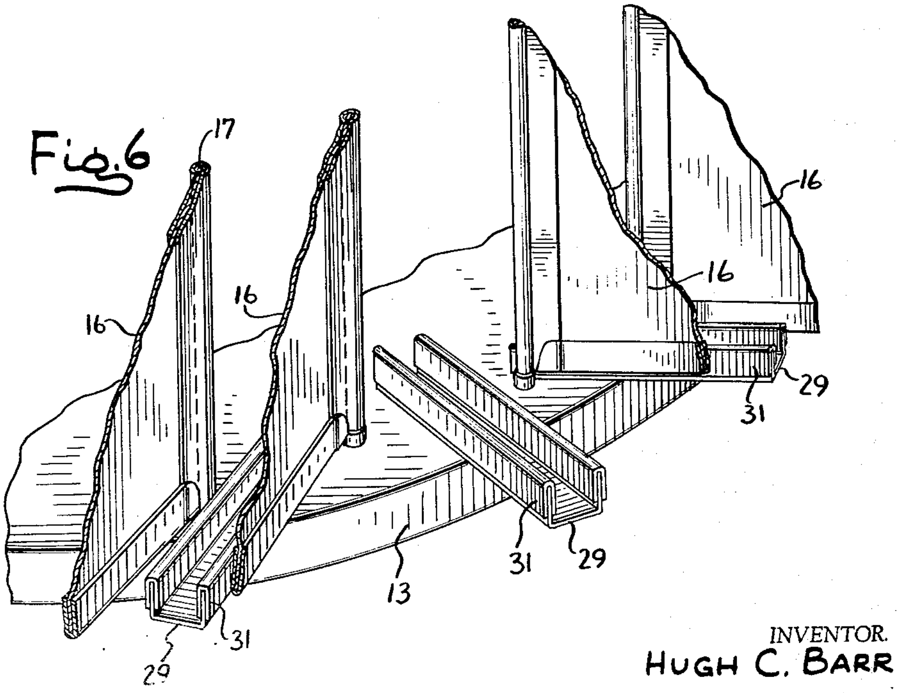
FIG. 6 is a fragmentary perspective view of the lower disc of the assembly and the lower edge portions of several record panels pivotally mounted thereon with the panel stops of the present invention disposed therebetween.

These stop means 29 are suitably in the form of channel components, the sides being desirably covered by resilient cushioning materials as indicated at 31 in FIG. 6. The stop means 29 are pivoted intermediate their lengths and extend inwardly a distance, so that when the frame 16 is pivoted its movement is limited by the stop 29. The movement of the latter is also limited by abutment against the panel member, as indicated in FIG. 3 to thus bring the stop 29 and panel 16 into mutually limiting pivotal engagement.

Figure 3:
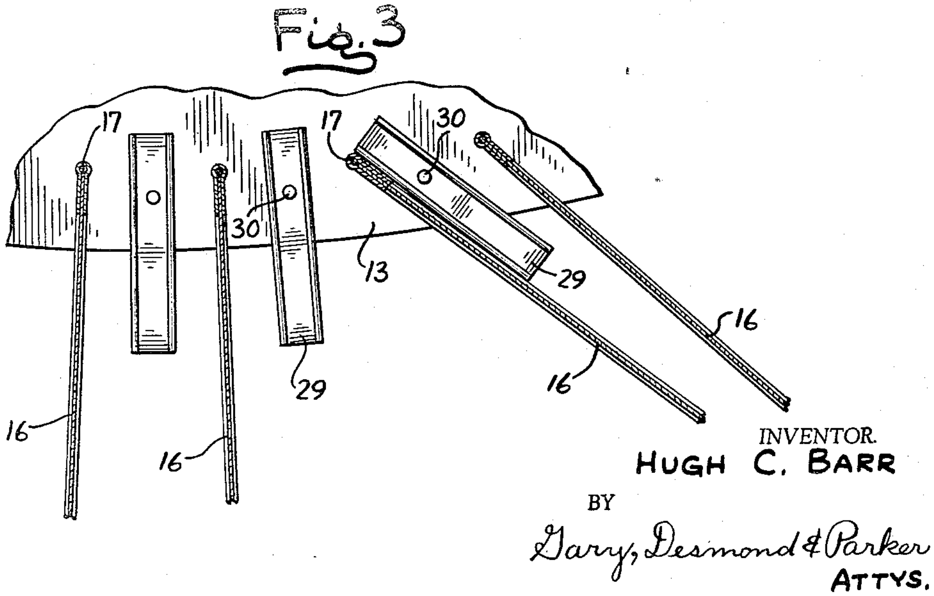
FIG. 3 is a fragmentary transverse sectional detailed view of the assembly of the present invention illustrating the arrangement of stops between adjacent panels.
Figures 4, 5:
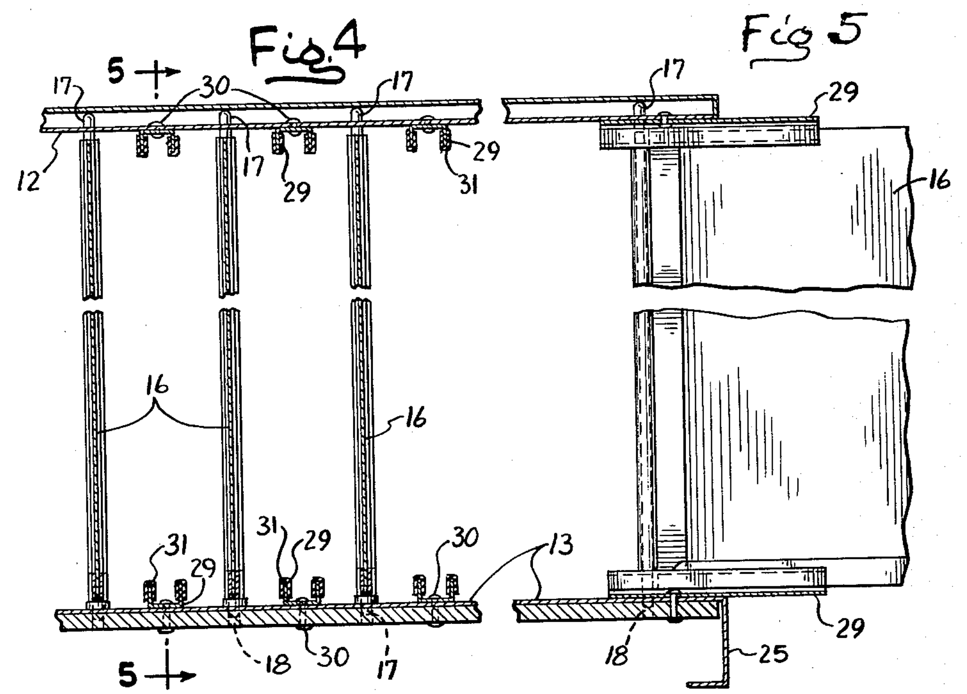
FIG. 4 is a fragmentary vertical sectional view taken on the line 4—4 of FIG. 2.
FIG. 5 is a section taken on the line 5—5 of FIG. 4.

Although FIG. 3 shows limiting movement of a panel stop 29 and panel 16 in a right-hand direction, pivotal movement of the panel 16 in a left-hand direction will bring it into engagement with the adjacent left-hand panel stop 29 in mutual abutting engagement the same as shown and described for the right-hand movement.

Although I have shown and described the preferred embodiment of my invention, it will be understood by those skilled in the art that changes may be made in the details thereof without departing from its scope as comprehended by the following claims.

I claim:

1. A record filing device comprising a supporting stand including a vertically disposed axial shaft, a vertically spaced pair of discs mounted for rotation about said shaft, a plurality of vertically extending record panels disposed edgewise between said discs on pivot means carried by said panels and engaged on said discs adjacent their outer peripheral edges on a uniform radius and in angularly spaced relationship to each other, and stop means disposed between each of said panels for limiting their pivotal movement and to prevent abutment of adjacent panels against each other, comprising an arm pivoted intermediate its length on at least one of said discs on a greater radius from said axial shaft than that on which the panels are pivoted.

2. A record filing device comprising a supporting stand, a vertically spaced pair of plates mounted for joint rotation about their axes on said stand, a plurality of vertically extending record panels disposed edgewise between said plates on pivot means carried by said panels and engaged on said plates adjacent their outer edges in a uniform series and in regularly spaced relationship to each other, and stop means disposed between each of said panels for limiting their pivotal movement and to prevent abutment of adjacent panels against each other, said stop means each comprising an arm pivoted intermediate its length on at least one of said plates adjacent the panel pivots on a greater radius from said axis than that on which the panels are pivoted, each of said arms being adapted to abut against an adjacent panel in mutually limiting engagement.

3. A record filing device comprising a supporting stand including a vertically disposed axial shaft, a vertically spaced pair of discs mounted for rotation about said shaft, a plurality of vertically extending record panels disposed edgewise between said discs on pivot means carried by saild panels and engaged on said discs adjacent their outer peripheral edges on a uniform radius and in angularly spaced relationship to each other, stop means disposed between each of said panels for limiting their pivotal movement and to prevent abutment of adjacent panels against each other, comprising lever arms pivoted on each of the adjacent faces of said discs on a greater radius from said axial shaft that that on which the panels are pivoted and medially disposed between each adjacent panel, each of said arms including a resilient cover on the lateral faces thereof adapted to abut against an adjacent panel in mutually limiting engagement, and means for rotating said discs and their associated panels.

References Cited by the Examiner

UNITED STATES PATENTS

| | | | |
|---|---|---|---|
| 742,979 | 11/03 | Flanagan | 40—102 |
| 1,069,122 | 8/13 | Friedman | 40—35 |
| 1,077,555 | 11/13 | Rand | 40—102 |
| 1,294,130 | 2/19 | Lough | 40—35 |
| 1,511,518 | 10/29 | Juvet | 40—102 |
| 1,914,597 | 6/33 | Dobrowsky | 40—35 |
| 2,755,578 | 7/56 | Glacius | 40—72 |

CLAUDE A. LE ROY, *Primary Examiner.*